(12) United States Patent
Tanaka

(10) Patent No.: US 11,755,017 B2
(45) Date of Patent: Sep. 12, 2023

(54) INERTIAL SENSOR, ELECTRONIC INSTRUMENT, AND VEHICLE

(71) Applicant: Seiko Epson Corporation, Tokyo (JP)

(72) Inventor: Satoru Tanaka, Chino (JP)

(73) Assignee: SEIKO EPSON CORPORATION

( * ) Notice: Subject to any disclaimer, the term of this patent is extended or adjusted under 35 U.S.C. 154(b) by 263 days.

(21) Appl. No.: 16/912,798

(22) Filed: Jun. 26, 2020

(65) Prior Publication Data

US 2020/0409367 A1 Dec. 31, 2020

(30) Foreign Application Priority Data

Jun. 28, 2019 (JP) .................. 2019-121030

(51) Int. Cl.
| | |
|---|---|
| *G01P 15/125* | (2006.01) |
| *G01P 15/08* | (2006.01) |
| *G05D 1/02* | (2020.01) |
| *G01P 15/097* | (2006.01) |

(52) U.S. Cl.
CPC .......... *G05D 1/021* (2013.01); *G01P 15/0802* (2013.01); *G01P 15/097* (2013.01); *G01P 15/125* (2013.01); *G01P 2015/0831* (2013.01)

(58) Field of Classification Search
CPC ...... G01P 15/125; G01P 15/18; G01P 15/097; G01P 2015/0831; G01P 15/0802
See application file for complete search history.

(56) References Cited

U.S. PATENT DOCUMENTS

| | | | |
|---|---|---|---|
| 7,121,141 B2 | 10/2006 | McNeil | |
| 9,880,192 B2 | 1/2018 | Cheng et al. | |
| 2008/0173959 A1* | 7/2008 | Merassi ................ | B81B 3/0051 |
| | | | 73/514.24 |
| 2010/0117167 A1 | 5/2010 | Yokura et al. | |
| 2011/0023604 A1* | 2/2011 | Cazzaniga .............. | G01P 15/02 |
| | | | 73/514.32 |
| 2012/0186346 A1* | 7/2012 | McNeil ................. | G01P 15/125 |
| | | | 73/514.32 |
| 2013/0192362 A1 | 8/2013 | Rytkonen | |
| 2013/0229193 A1* | 9/2013 | Kakimoto ............. | G01P 15/125 |
| | | | 324/661 |
| 2013/0255382 A1* | 10/2013 | Tanaka .................. | G01P 15/125 |
| | | | 73/514.32 |

(Continued)

FOREIGN PATENT DOCUMENTS

| | | |
|---|---|---|
| JP | 2010-112930 A | 5/2010 |
| JP | 2014-209082 A | 11/2014 |

(Continued)

*Primary Examiner* — Helen C Kwok
(74) *Attorney, Agent, or Firm* — Harness, Dickey & Pierce, P.L.C.

(57) ABSTRACT

An inertial sensor includes, provided that axes X, Y, and Z are three axes perpendicular to one another, a substrate, a fixed section fixed to the substrate, a movable element that swings around a swing axis extending along the axis Y, a first beam and a second beam that link the fixed section to the movable element and are torsionally deformed by the swing motion of the movable element, and a detection electrode that is disposed on the substrate and overlaps with the movable element in the plan view along the axis-Z direction, and the first beam and the second beams differ in shape from each other and have the same torsional spring constant.

10 Claims, 8 Drawing Sheets

(56) References Cited

U.S. PATENT DOCUMENTS

| | | | | |
|---|---|---|---|---|
| 2014/0298909 A1* | 10/2014 | Simoni | ................... | G01P 1/006 |
| | | | | 73/514.32 |
| 2015/0316582 A1* | 11/2015 | Tanaka | .................. | G01P 15/125 |
| | | | | 73/514.32 |
| 2016/0047839 A1* | 2/2016 | Tanaka | ............... | G01C 19/5769 |
| | | | | 73/514.32 |
| 2016/0214853 A1* | 7/2016 | Thompson | ............ | B81B 3/0016 |
| 2017/0089945 A1* | 3/2017 | Naumann | ............. | G01P 15/125 |
| 2019/0063924 A1 | 2/2019 | Tanaka | | |
| 2019/0339078 A1* | 11/2019 | McNeil | ................ | B81B 3/0062 |

FOREIGN PATENT DOCUMENTS

| | | |
|---|---|---|
| JP | 2015-059830 A | 3/2015 |
| JP | 2015-509189 A | 3/2015 |
| JP | 2019-045172 A | 3/2019 |
| WO | 2014-156119 A1 | 10/2014 |

\* cited by examiner

INERTIAL SENSOR, ELECTRONIC INSTRUMENT, AND VEHICLE

The present application is based on, and claims priority from JP Application Serial Number 2019-121030, filed Jun. 28, 2019, the disclosure of which is hereby incorporated by reference herein in its entirety.

BACKGROUND

1. Technical Field

The present disclosure relates to an inertial sensor, an electronic instrument, and a vehicle.

2. Related Art

An inertial sensor described in JP-A-2019-45172 is a sensor capable of detecting acceleration in an axis-Z direction and includes a substrate, a fixed section fixed to the substrate, a movable element that performs seesaw swing relative to the substrate around a swing axis extending along an axis-Y direction, a pair of beams that connect the fixed section to the movable element, and a detection electrode provided on the substrate.

The movable element includes a first movable section and a second movable section that are so provided as to sandwich the swing axis and differ from each other in terms of rotational moment around the swing axis. The detection electrode includes a first detection electrode so disposed on the substrate as to face the first movable section and a second detection electrode so disposed on the substrate as to face the second movable section.

When acceleration in the axis-Z direction acts on the inertial sensor having the configuration described above, the movable element performs the seesaw swing around the swing axis while torsionally deforming the beams, and the capacitance between the first movable section and the first detection electrode and the capacitance between the second movable section and the second detection electrode change accordingly in opposite phases. The acceleration in the axis-Z direction can therefore be detected based on the changes in the capacitance.

However, in the inertial sensor described in JP-A-2019-45172, in which the pair of beams have the same shape, the seesaw swing, which is the vibration under detection, is accompanied by unnecessary vibration different from the vibration under detection, and the frequency of the unnecessary vibration is close to the frequency of the seesaw swing. The unnecessary vibration is therefore likely to occur, and there is a problem of a corresponding decrease in detection sensitivity of the inertial sensor.

SUMMARY

An inertial sensor described in an embodiment includes, provided that axes X, Y, and Z are three axes perpendicular to one another, a substrate, a fixed section fixed to the substrate, a movable element that swings around a swing axis extending along the axis Y, a first beam and a second beam that link the fixed section to the movable element and are torsionally deformed by the swing motion of the movable element, and a detection electrode that is disposed on the substrate and overlaps with the movable element in a plan view along the axis-Z direction, and the first beam and the second beams differ in shape from each other and have the same torsional spring constant.

DESCRIPTION OF EXEMPLARY EMBODIMENTS

An inertial sensor, an electronic instrument, and a vehicle according to the present disclosure will be described below in detail based on embodiments shown in the accompanying drawings.

First Embodiment

Figure 1:
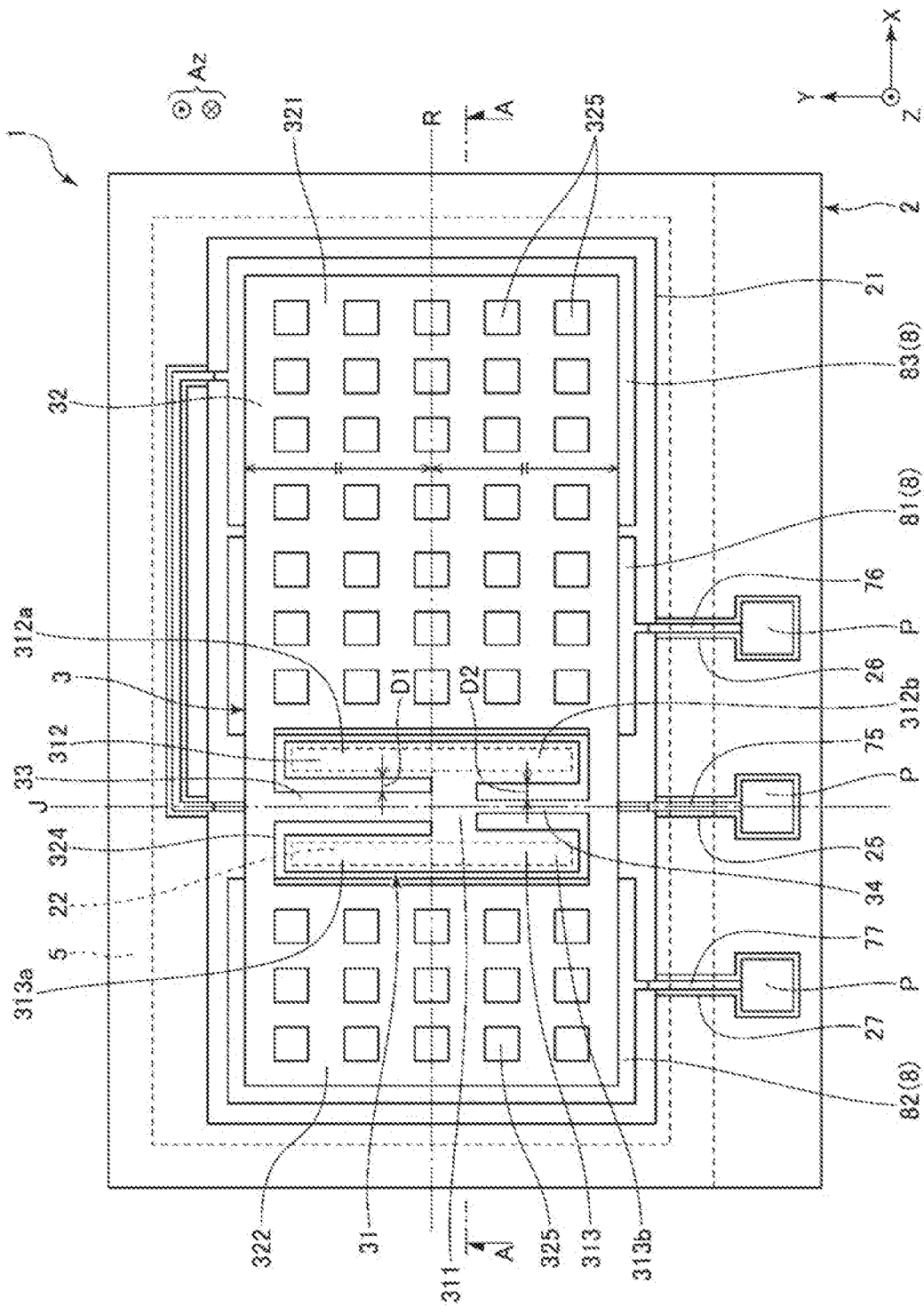
FIG. 1 is a plan view showing an inertial sensor according to a first embodiment.
Figure 2:
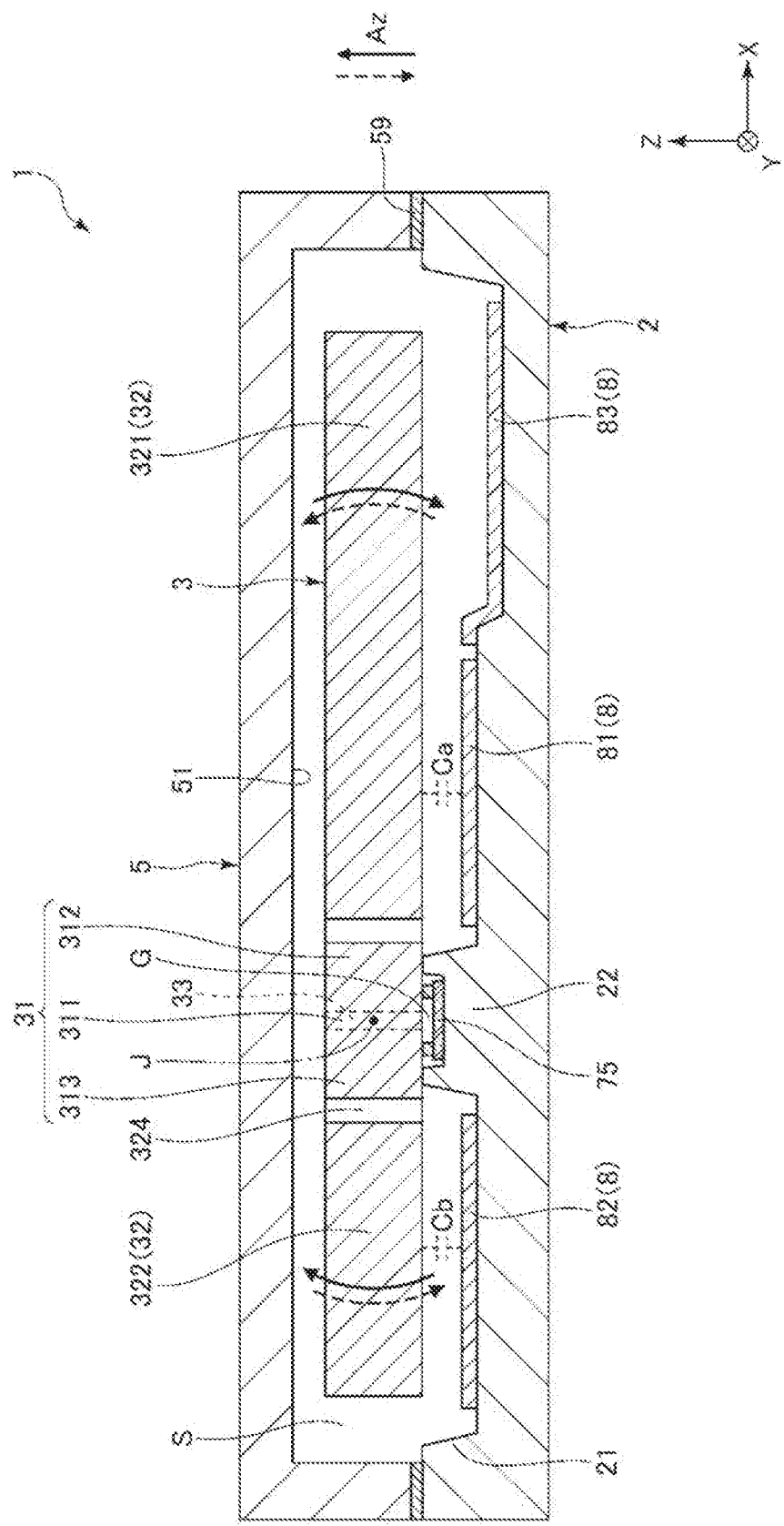
FIG. 2 is a cross-sectional view of the inertial sensor taken along the line A-A in FIG. 1.
Figure 3:
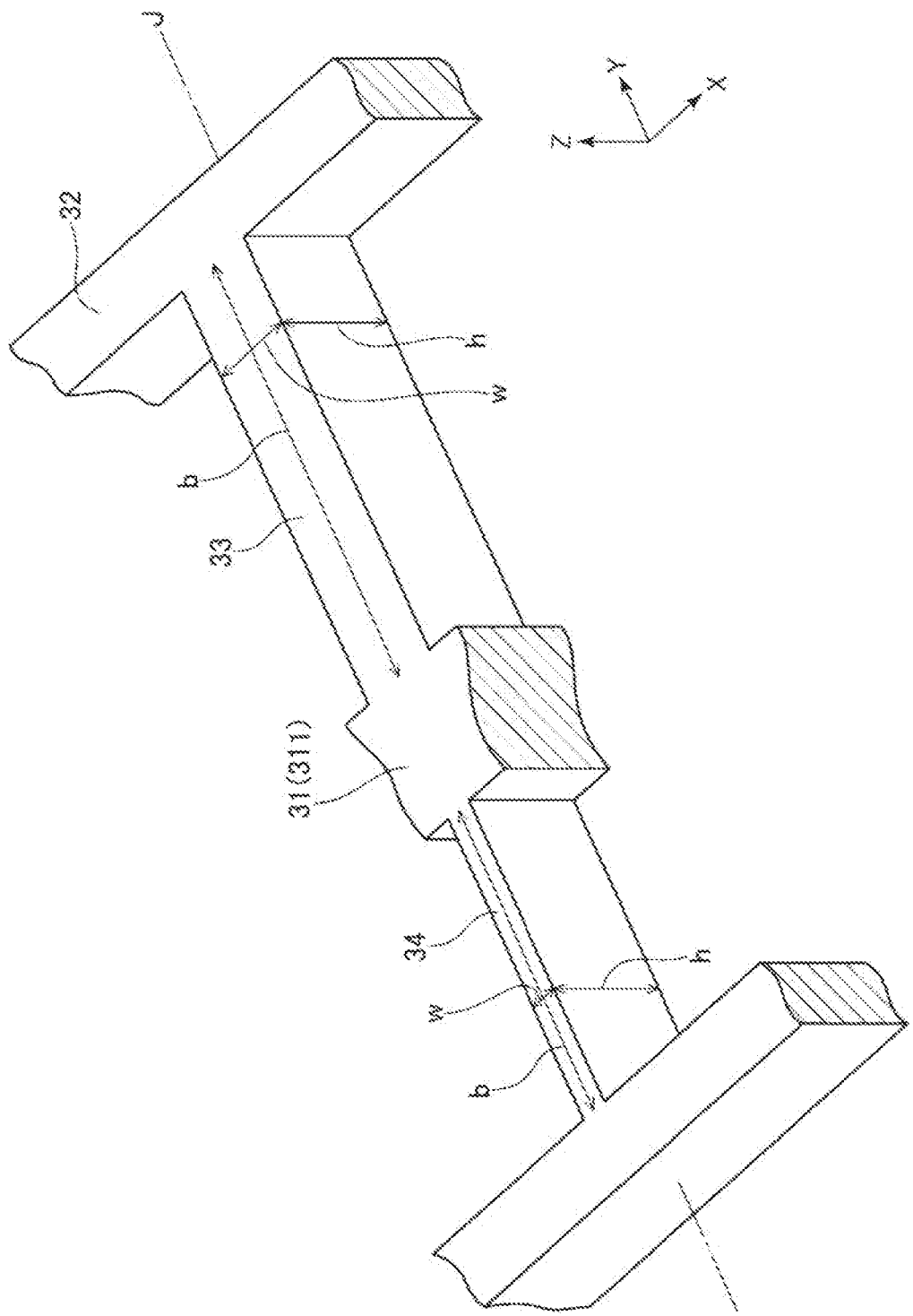
FIG. 3 is a perspective view showing a first beam and a second beam.

FIG. 1 is a plan view showing an inertial sensor according to a first embodiment. FIG. 2 is a cross-sectional view of the inertial sensor taken along the line A-A in FIG. 1. FIG. 3 is a perspective view showing a first beam and a second beam.

In the following description, three axes perpendicular to one another, axes X, Y, and Z are drawn for convenience of the description. The direction along the axis X, that is, the direction parallel to the axis X is also called an "axis-X direction," the direction along the axis Y, that is, the direction parallel to the axis Y is also called an "axis-Y direction," and the direction along the axis Z, that is, the direction parallel to the axis Z is also called an "axis-Z direction." The side facing the front end of the arrow of each of the axes is also called a "positive side," and the side opposite the positive side is also called a "negative side." The positive side of the axis-Z direction is also called "upper," and the negative side of the axis-Z direction is also called "lower." In the specification of the present application, the state expressed by the term "perpendicular" includes a state comparable to "perpendicular" in a technical common sense, specifically, a state in which two lines intersect each other at 90° and also a state in which two lines intersect each other at an angle that slightly deviates from 90°, for example, an angle that falls within 90°± about 5°. Similarly, the state expressed by the term "parallel" includes a state comparable to "parallel" in a technical common sense, specifically, a state in which the angle between two lines is 0° and also a state in which the angle between two lines deviates from 0° by about ±5°.

An inertial sensor 1 shown in FIG. 1 is an acceleration sensor that detects acceleration Az in the axis-Z direction. The inertial sensor 1 includes a substrate 2, a sensor device 3, which is disposed on the substrate 2, and a lid 5, which is bonded to the substrate 2 and covers the sensor device 3.

The substrate 2 has a recess 21, which opens toward the upper side, as shown in FIG. 1. In the plan view along the axis-Z direction, the recess 21 is so formed as to accommodate the sensor device 3 and to be larger than the sensor device 3. The substrate 2 includes a mount 22, which protrudes from the bottom surface of the recess 21, as shown in FIG. 2. The sensor device 3 is bonded to the upper surface of the mount 22. The substrate 2 has grooves 25, 26, and 27, which open via the upper surface of the substrate 2, as shown in FIG. 1.

The substrate 2 can, for example, be a glass substrate made of a glass material containing an alkali metal ion that is a movable ion, such as $Na^+$, for example, borosilicate glass, such as Pyrex glass and Tempax glass (both are registered trademark). The substrate 2 is, however, not necessarily a specific substrate and may instead, for example be a silicon substrate or a ceramic substrate.

The substrate 2 is provided with an electrode 8, as shown in FIG. 1. The electrode 8 includes a first detection electrode 81, a second detection electrode 82, and a dummy electrode 83, which are disposed on the bottom surface of the recess 21 and overlap with the sensor device 3 in the plan view. The substrate 2 further includes wiring lines 75, 76, and 77 disposed in the grooves 25, 26, and 27, respectively.

One end portion of each of the wiring lines 75, 76, and 77 functions as an electrode pad P, which is exposed to the region outside the lid 5 and electrically couples the inertial sensor 1 to an external apparatus. The wiring line 75 is electrically coupled to the sensor device 3 and the dummy electrode 83. The wiring line 76 is electrically coupled to the first detection electrode 81. The wiring line 77 is electrically coupled to the second detection electrode 82. That is, the dummy electrode 83 has the same potential as that at a movable element 32.

The lid 5 has a recess 51, which opens via the lower surface of the lid 5, as shown in FIG. 2. The lid 5 is so bonded to the upper surface of the substrate 2 as to accommodate the sensor device 3 in the recess 51. The lid 5 and the substrate 2 form an internal accommodation space S, which accommodates the sensor device 3. It is preferable that the accommodation space S is a hermetically sealed space and is filled with an inert gas, such as nitrogen, helium, and argon, and that the pressure of the inert gas that fills the accommodation space S is substantially equal to the atmospheric pressure at the temperature at which the inertial sensor 1 is used (from about −40° C. to 125° C.). It is, however, noted that the accommodation space S does not necessarily have a specific atmosphere and may be, for example, under pressure higher or lower than the atmospheric pressure.

The lid 5 can, for example, be a silicon substrate. It is, however, noted that the lid 5 is not necessarily formed of a specific substrate and may, for example, be formed of a glass substrate or a ceramic substrate. The method for bonding the substrate 2 and the lid 5 to each other is not limited to a specific method and may be selected as appropriate in accordance with the materials of the substrate 2 and the lid 5. For example, the method can be anodic bonding, activation bonding in which bonding surfaces activated by plasma radiation are bonded to each other, bonding using a bonding material, such as glass frit, and diffusion bonding in which a metal film deposited on the upper surface of the substrate 2 and a metal film deposited on the lower surface of the lid 5 are bonded to each other. In the present embodiment, the substrate 2 and the lid 5 are bonded to each other with glass frit 59, which is made of low-melting-point glass.

The sensor device 3 is formed, for example, by etching an electrically conductive silicon substrate into which an impurity, such as phosphorus (P), boron (B), and arsenic (As), has been doped, particularly, patterning the silicon substrate in a Bosch process, which is a deep-groove etching technology. The sensor device 3 includes a fixed section 31, which is bonded to the upper surface of the mount 22, the movable element 32, which is swingable relative to the fixed section 31 around a swing axis J extending along the axis Y, and a first beam 33 and a second beam 34, which connect the fixed section 31 to the movable element 32, as shown in FIG. 1. When acceleration Az acts on the sensor device 3, the movable element 32 performs seesaw swing around the swing axis J while torsionally deforming the first and second beams 33, 34, as will be described later.

The movable element 32 has an oblong shape having a longitudinal direction that coincides with the axis-X direction in the plan view along the axis-Z direction. The movable element 32 includes a first movable section 321 and a second movable section 322 so disposed as to sandwich the swing axis J in the plan view along the axis-Z direction. The first movable section 321 is located on the positive side of the swing axis J in the axis-X direction, and the second movable section 322 is located on the negative side of the swing axis J in the axis-X direction. The first movable section 321 is longer than the second movable section 322 in the axis-X direction, and the rotational moment of the first movable section 321 around the swing axis J produced when the acceleration Az acts on the inertial sensor 1 is greater than that of the second movable section 322.

The difference in the rotational moment causes the movable element 32 to perform seesaw swing around the swing axis J when the acceleration Az acts on the inertial sensor 1. The seesaw swing means that displacement of the first movable section 321 toward the positive side of the axis-Z direction causes displacement of the second movable section 322 toward the negative side of the axis-Z direction, and that conversely, displacement of the first movable section 321 toward the negative side of the axis-Z direction causes displacement of the second movable section 322 toward the positive side of the axis-Z direction.

The movable element 32 has an opening 324 formed of a through hole and located between the first movable section 321 and the second movable section 322. The fixed section 31 and the first and second beams 33, 34 are disposed in the opening 324. Since the fixed section 31 and the first and second beams 33, 34 are thus disposed inside the movable element 32, the size of the sensor device 3 can be reduced. The movable element 32 has a plurality of through holes 325 uniformly formed across the movable element 32. The through holes 325 can reduce air-resistance-induced damping of the movable element 32. It is, however, noted that the through holes 325 may be omitted or may not be uniformly arranged.

In the plan view along the axis-Z direction, let R be an imaginary center line that passes through the center of the movable element 32 in the axis-Y direction and extends in the axis-X direction, and the movable element 32 has a symmetrical shape with respect to the imaginary center line R in the plan view along the axis-Z direction. One-side portion and the-other-side portion of the movable element 32 with respect to the imaginary center line R can therefore be balanced with each other in terms of shape and mass, whereby the movable element 32 can more smoothly perform the seesaw swing around the swing axis J. A decrease in sensitivity at which the acceleration Az is detected can therefore be effectively suppressed. The state expressed by the term "symmetrical" includes not only a state in which complete symmetry is achieved but, for example, a state in which possible manufacturing errors or errors small enough not to substantially cause functional degradation are present.

The fixing section 31 provided inside the movable element 32 is bonded to the mount 22, for example, in anodic bonding. The method for bonding the fixing section 31 to the mount 22 is not limited to a specific method. The fixing section 31 has an H-letter shape in the plan view along the axis-Z direction and includes a base section 311, to which the first and second beams 33, 34 are connected, a leg section 312, which is located on the positive side of the base section 311 in the axis-X direction and extends in the axis-Y direction, and a leg section 313, which is located on the negative side of the base section 311 in the axis-X direction and extends in the axis-Y direction. In the plan view along the axis-Z direction, the base section 311 overlaps with the swing axis J, with the leg section 312 so provided as to be shifted from the swing axis J toward the positive side of the axis-X direction and the leg section 313 so provided as to be shifted from the swing axis J toward the negative side of the axis-X direction.

The thus shaped fixing section 31 is bonded to the mount 22 via the leg sections 312 and 313. That is, the leg sections 312 and 313 form a bonding section that bonds the fixing section 31 to the mount 22. The configuration described above can ensure a sufficiently large area where the fixing section 31 is bonded to the mount 22 to sufficiently increase the strength at which the fixing section 31 is bonded to the mount 22. On the other hand, the base section 311 is not bonded to the mount 22. In other words, a portion of the fixing section 31 that is the portion between the first beam 33 and the second beam 34 is not bonded to the mount 22. Further, the base section 311 is separate from the mount 22. An air gap G is therefore formed between the base section 311 and the mount 22. The base section 311 along with the first and second beams 33, 34 is therefore readily deformed, whereby the movable element 32 more stably performs the seesaw swing around the swing axis J. Moreover, stress concentration at the aforementioned portion of the fixing section 31 decreases, whereby breakage of the sensor device 3 can be effectively suppressed.

The first and second beams 33, 34 are so provided as to sandwich the base section 311, with the first beam 33 provided on the positive side of the base section 311 in the axis-Y direction and the second beam 34 provided on the negative side of the base section 311 in the axis-Y direction, in the plan view along the axis-Z direction. The first and second beams 33, 34 each has a rod-like shape or an elongated shape extending along the axis-Y direction and are provided coaxially with each other around the swing axis J. The first and second beams 33, 34 will be described later in more detail.

Now, return to the description of the electrode 8 disposed on the bottom surface of the recess 21. In the plan view along the axis-Z direction, the first detection electrode 81 is so disposed as to overlap with a base portion of the first movable section 321, and the second detection electrode 82 is so disposed as to overlap with a base portion of the second movable section 322, as shown in FIGS. 1 and 2. The first and second detection electrodes 81, 82 are provided symmetrically with respect to the swing axis J in the plan view along the axis-Z direction. The dummy electrode 83 is located on the positive side of the first detection electrode 81 in the axis-X direction and so disposed as to overlap with a front end portion of the first movable section 321.

Although not shown, when the inertial sensor 1 is driven, drive voltage is applied to the sensor device 3 via the wiring line 75. To this end, the first detection electrode 81 is coupled to a QV amplifier via the wiring line 76, and the second detection electrode 82 is coupled to another QV amplifier via the wiring line 77. As a result, capacitance Ca is formed between the first movable section 321 and the first detection electrode 81, and capacitance Cb is formed between the second movable section 322 and the second detection electrode 82.

When the acceleration Az acts on the inertial sensor 1, the movable element 32 performs seesaw swing around the swing axis J. The seesaw swing of the movable element 32 changes the gap between the first movable section 321 and the first detection electrode 81 and the gap between the second movable section 322 and the second detection electrode 82 in opposite phases, and the capacitance Ca and the capacitance Cb change in opposite phases accordingly. The inertial sensor 1 can therefore detect the acceleration Az based on the difference between the capacitance Ca and the capacitance Cb (amount of change in capacitance).

The configuration of the inertial sensor 1 has been briefly described. The first and second beams 33, 34 will next be described in detail. The first and second beams 33, 34 have the same torsional spring constant Kt around the swing axis J but differ in shape from each other. When the first and second beams 33, 34 have the same torsional spring constant Kt, the movable element 32 can smoothly perform the seesaw swing around the swing axis J, which is the vibration for detection of the acceleration Az. When the first and second beams 33, 34 differ in shape from each other, occurrence of vibration other than the seesaw swing around the swing axis J, which is the vibration for detection of the acceleration Az, that is, the unnecessary vibration can be effectively suppressed. Specifically, the configuration described above increases the difference in frequency between the vibration under detection and the unnecessary vibration, that is, a detuned frequency as compared with the related-art configuration in which the first and second beams 33, 34 have the same shape and the same torsional spring constant Kt around the swing axis J. The unnecessary vibration is therefore unlikely to couple with the vibration under detection accordingly, whereby occurrence of the unnecessary vibration is suppressed.

The state in which the first and second beams 33, 34 have the same torsional spring constant Kt includes not only a state in which the torsional spring constant Kt of the first beam 33 is equal to the torsional spring constant Kt of the second beam 34 but, for example, a state in which possible manufacturing errors or errors small enough not to substantially cause functional degradation are present, for example, errors that fall within ±10% of an intended value.

The unnecessary vibration occurs in a variety of modes. In particular, as a mode in which the vibration has a frequency close to the frequency of the vibration under detection, the following two modes can, for example, be presented: A first mode is a mode of in-plane rotational vibration in which the movable element 32 performs in-plane rotation around the axis Z relative to the fixing section 31; and a second mode is a mode of translational vibration in which the movable element 32 translationally vibrates in the axis-X direction. The mode of the unnecessary vibration is, however, not limited to the modes described above and may be another mode according to the design of the sensor device 3. The frequency in a mode other than the modes described above may be close to the frequency in the mode of the vibration under detection.

The torsional spring constant Kt of the first and second beams 33, 34 will next be described. The torsional spring constant Kt can be expressed by Expression (1) below.

$$Kt = 2\frac{Ghw^3}{3b}\left[1 - \frac{192}{\pi^5} \times \frac{w}{h}\tanh\left\{\frac{\pi h}{2w}\right\}\right] \quad (1)$$

The symbols in Expression (1) described above have the following meanings.

b: length of first and second beams 33, 34 in axis-Y direction (hereinafter also referred to as "length b"), h: length of first and second beams 33, 34 in axis-Z direction (hereinafter also referred to as "thickness h"), w: length of first and second beams 33, 34 in axis-X direction (hereinafter also referred to as "width w"), G: modulus of transverse elasticity of first and second beams 33, 34

The torsional spring constant Kt of the first and second beams 33, 34 depends on the length b, the thickness h, and the width w of the first and second beams 33, 34, and adjusting these values as appropriate allows the first and second beams 33, 34 to have the same torsional spring constant Kt while allowing the first and second beams 33, 34 to have shapes different from each other. To this end, in the sensor device 3, the first and second beams 33, 34 have different values of at least two of the length b, the thickness h, and the width w. The first and second beams 33, 34 can thus have the same torsional spring constant Kt and have shapes different from each other in a simpler, more reliable manner.

In particular, in the present embodiment, the first and second beams 33, 34 have lengths b and widths w different from each other but have the same thickness h, which is the remaining parameter, as shown in FIG. 3. As described above, the sensor device 3 is formed by patterning a plate-shaped silicon substrate in the Bosch process. Therefore, the length b and the width w, which are each a dimension in the plan view, can be readily designed, whereas the thickness h is difficult to intentionally design because the thickness h depends on the thickness of the silicon substrate. Further, controlling the thickness h requires reduction in the thickness of only the first and second beams 33, 34 in another etching step, resulting in complicated manufacturing processes. The configuration in which the first and second beams 33, 34 have lengths b and widths w different from each other but have the same thickness h as described above therefore more readily allows the first and second beams 33, 34 to have shapes different from each other but have the same torsional spring constant Kt.

The first and second beams 33, 34 have the same value expressed by Expression (2) below. In this case, the first and second beams 33, 34 can have the same torsional spring constant Kt, as seen from Expression (1) described above, whereby the first and second beams 33, 34 can be readily designed.

$$2\frac{Ghw^3}{3b}\left[1 - \frac{192}{\pi^5} \times \frac{w}{h}\tanh\left\{\frac{\pi h}{2w}\right\}\right] \quad (2)$$

The values b and h are not each limited to a specific value, and it is preferable that b≥3h is satisfied. In this case, Expression (1) described above is more likely to hold true, whereby the first and second beams 33, 34 can have the same torsional spring constant Kt in a more precise, simpler manner.

Next, consider an inertial sensor having the configuration in which the first and second beams 33, 34 have shapes different from each other but have the same torsional spring constant Kt (Example), such as the inertial sensor according to the present embodiment, and an inertial sensor having the configuration in which the first and second beams 33, 34 have the same shape and the same torsional spring constant Kt (Comparative Example), such as the inertial sensor in the related art, and the magnitude of change in the difference in frequency between the mode of vibration under detection and the mode of in-plane rotational vibration/the mode of translational vibration in the axis-X direction, which are each a mode of unnecessary vibration, is simulated for Example and Comparative Example. Tables 1 and 2 below show the results of the simulation. Table 1 shows the dimensions of the first and second beams 33, 34, and Table 2 shows the results of the simulation. The values in the parentheses in Table 2 are each the difference in frequency from the mode for vibration under detection, that is, the detuned frequency.

TABLE 1

|  | First beam 33 | Second beam 34 |
| --- | --- | --- |
| Example | w = 2.93 μm | w = 2.36 μm |
|  | b = 174.7 μm | b = 100.0 μm |
| Comparative | w = 2.93 μm | w = 2.93 μm |
| Example | b = 174.7 μm | b = 174.7 μm |

TABLE 2

|  | Frequency [Hz] | |
| --- | --- | --- |
| Vibration mode | Example | Comparative Example |
| Mode of vibration under detection | 2240 | 2254 |
| Mode of in-plane rotational vibration | 4513 (2273) | 3452 (1198) |
| Mode of translational vibration | 13005 (10765) | 9114 (6860) |

According to Example of the present disclosure, the difference in frequency between the mode for vibration under detection and each of the modes for unnecessary vibration (detuned frequency) can be greater than the difference in Comparative Example, as seen from Table 2. Therefore, according to Example, the unnecessary vibration is unlikely to couple with the vibration under detection, whereby occurrence of the unnecessary vibration is suppressed, as described above, as compared with Comparative Example.

In the present embodiment, the width w of the first beam 33 is greater than the width w of the second beam 34, as shown in Table 1. In relation to this, out of the leg sections 312 and 313, which are part of the fixed section 31, the width of portions facing the first beam 33, that is, portions 312a and 313a juxtaposed with the first beam 33 in the axis-X direction is smaller than the width of portions facing the second beam 34, that is, portions 312b and 313b juxtaposed with the second beam 34 in the axis-X direction, and a separation distance D1 from the first beam 33 to the portions 312a and 313a is equal to a separation distance D2 from the second beam 34 to the portions 312b and 313b. As a result, the silicon substrate can be etched in the Bosch process at a single etching speed resulting from a micro-loading effect at which can be fixed in both the first and second beams 33, 34. The first and second beams 33, 34 can therefore be etched by the same amount, whereby deviation from designed shape values of the first and second beams 33, 34 can be suppressed. As a result, the first and second beams 33, 34 can more reliably have the same torsional spring constant Kt.

The inertial sensor 1 has been described. The thus configured inertial sensor includes, provided that the axes X, Y, and Z are three axes perpendicular to one another, the substrate 2, the fixed section 31, which is fixed to the substrate 2, the movable element 32, which swings around the swing axis J extending along the axis Y, the first beam 33 and the second beam 34, which link the fixed section 31 to the movable element 32 and are torsionally deformed by the swing motion of the movable element 32, and the first and second detection electrodes 81, 82 as the detection electrode, which are disposed on the substrate 2 and overlap with the movable element 32 in the plan view along the axis-Z direction. The first and second beams 33, 34 differ in shape from each other but have the same torsional spring constant Kt. When the first and second beams 33, 34 have the same torsional spring constant Kt, the seesaw swing around the swing axis J, which is the vibration for detection of the acceleration Az, can be smoothly performed. When the first and second beams 33, 34 differ in shape from each other, occurrence of vibration other than the seesaw swing around the swing axis J, which is the vibration for detection of the acceleration Az, that is, the unnecessary vibration can be effectively suppressed.

The first beam 33 and the second beam 34 extend in the axis-Y direction and have different values of at least two of the width w, which is the length in the axis-X direction, the length b, which is the length in the axis-Y direction, the thickness h, which is the length in the axis-Z direction, as described above. Since the torsional spring constant Kt of the first and second beams 33, 34 depends on the length b, the thickness h, and the width w of the first and second beams 33, 34, adjusting these values as appropriate allows the first and second beams 33, 34 to have the same torsional spring constant Kt while allowing the first and second beams 33, 34 to have shapes different from each other.

The first beam 33 and the second beam 34 have widths w and lengths b different from each other but have the same thickness h, as described above. The first and second beams 33, 34 are formed by patterning a plate-shaped silicon substrate in the Bosch process. Therefore, the length b and the width w, which are each a dimension in the plan view, can be readily designed, whereas the thickness h is difficult to intentionally design because the thickness h depends on the thickness of the silicon substrate. Further, controlling the thickness h requires reduction in the thickness of only the first and second beams 33, 34 in another etching step, resulting in complicated manufacturing processes. The configuration in which the first and second beams 33, 34 have lengths b and widths w different from each other but have the same thickness h therefore more readily allows the first and second beams 33, 34 to have shapes different from each other but have the same torsional spring constant Kt.

As described above, the first and second beams 33, 34 have the same value expressed by Expression (2) described above. In this case, the first and second beams 33, 34 can have the same torsional spring constant Kt, whereby the first and second beams 33, 34 can be readily designed.

The movable element 32 has the opening 324, and the fixed section 31, the first beam 33, and the second beam 34 are disposed in the opening 324, as described above. The first beam 33 is located on one side of the fixed section 31 in the axis-Y direction, and the second beam 34 is located on the other side of the fixed section 31 in the axis-Y direction. Since the fixed section 31 and the first and second beams 33, 34 are thus provided inside the movable element 32, the size of the inertial sensor 1 can be reduced. Further, providing the first and second beams 33, 34 on opposite sides of the fixed section 31 allows the movable element 32 to be supported in a well-balanced manner.

The imaginary center line R is a straight line that passes through the center of the movable element 32 in the axis-Y direction and extends in the axis-X direction, and the movable element 32 has a symmetrical shape with respect to the imaginary center line R in the plan view along the axis-Z direction, as described above. One-side portion and the-other-side portion of the movable element 32 with respect to the imaginary center line R can therefore be balanced with each other in terms of shape and mass, whereby the movable element 32 can more smoothly perform the seesaw swing around the swing axis J. A decrease in sensitivity at which the acceleration Az is detected can therefore be effectively suppressed.

The bonding portion that bonds the fixed section 31 to the substrate 2, that is, the leg sections 312 and 313 are shifted from the region between a connection portion that connects the fixed section 31 to the first beam 33 and a connection portion that connects the fixed section 31 to the second beam 34 in the plan view along the axis-Z direction, as described above. In other words, the base section 311, which is located between the first beam 33 and the second beam 34 is not bonded to the substrate 2. The base section 311 along with the first and second beams 33, 34 is therefore readily deformed, whereby the movable element 32 more stably performs the seesaw swing around the swing axis J. Further, stress concentration at the aforementioned region of the fixing section 31 decreases, whereby breakage of the sensor device 3 can be effectively suppressed.

Second Embodiment

Figure 4:
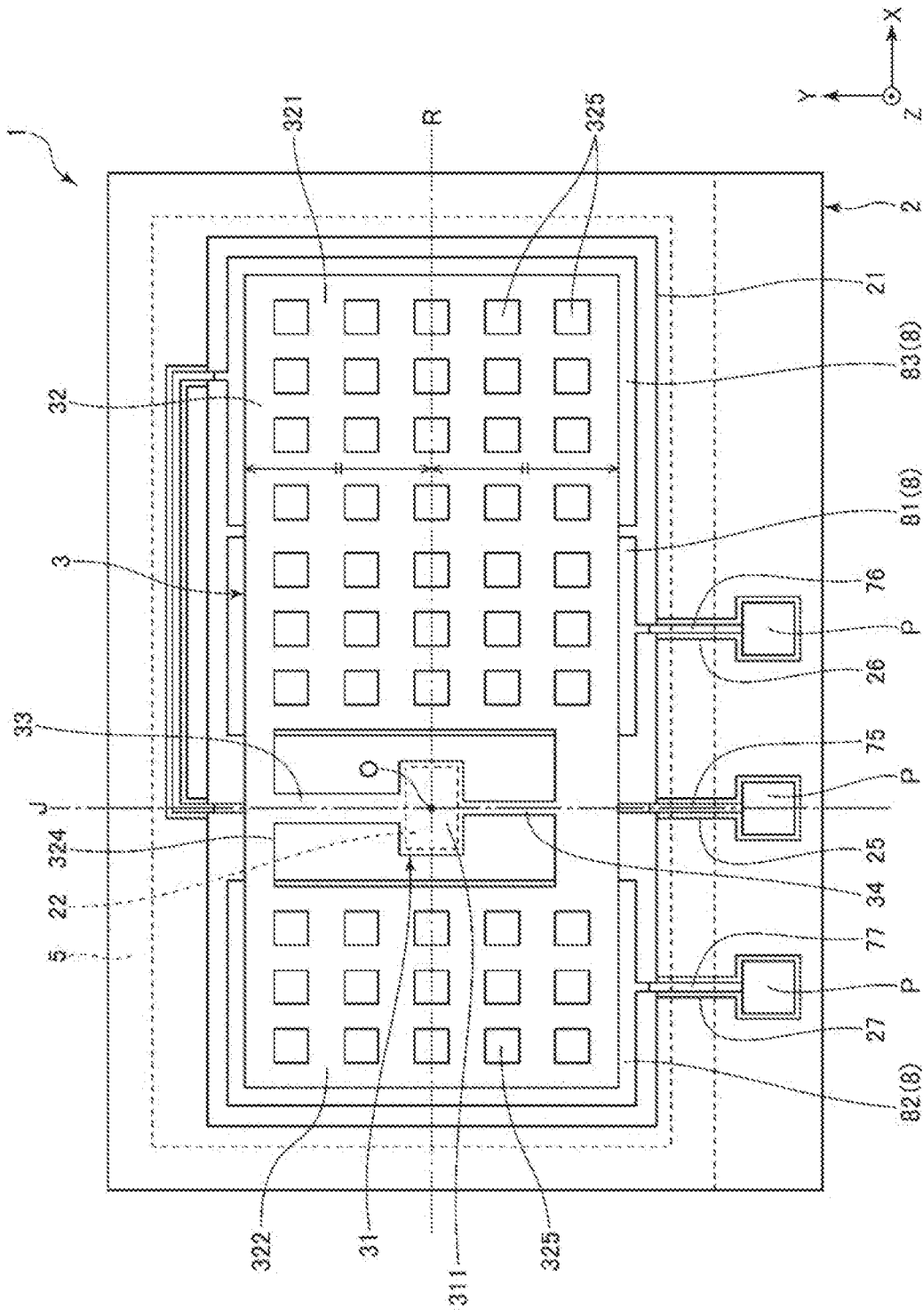
FIG. 4 is a plan view showing an inertial sensor according to a second embodiment.

FIG. 4 is a plan view showing an inertial sensor according to a second embodiment.

The present embodiment is the same as the first embodiment described above except the sensor device 3 is configured differently. The following description of the present embodiment will be primarily made of the difference from the embodiment described above, and the same items as those in the embodiment described above will not be described. In FIG. 4, the same configurations as those in the embodiment described above have the same reference characters.

In the inertial sensor 1 shown in FIG. 4, the fixed section 31 is formed of the base section 311 out of the base section 311 and the leg sections 312 and 313 described in the aforementioned first embodiment. The base section 311 is bonded to the mount 22. That is, the bonding portion that bonds the fixed section 31 to the substrate 2 is located between the connection portion that connects the base section 311 to the first beam 33 and the connection portion that connects the base section 311 to the second beam 34. The size of the fixed section 31 can therefore be reduced. In this case, reducing the size of the inertial sensor 1 or increasing the sizes of the movable element 32 and the first and second detection electrodes 81, 82 allows an increase in the sensitivity of the inertial sensor 1. That is, the inertial sensor 1 can be designed with increased flexibility.

The center O of the base section 311 is located on the imaginary center line R in the plan view along the axis-Z direction. In other words, the center of the combination of the connection portion that connects the base section 311 to the first beam 33 and the connection portion that connects the base section 311 to the second beam 34 is located on the imaginary center line R. As a result, when the substrate 2 warps due to external force or a temperature change, variation in the capacitance Ca between the first movable section 321 and the first detection electrode 81 on one side of the imaginary center line R and variation in the capacitance Ca on the other side can be substantially equal to each other. Similarly, variation in the capacitance Cb between the second movable section 322 and the second detection electrode 82 on one side of the imaginary center line R and variation in the capacitance Cb on the other side can be substantially equal to each other. As a result, the accuracy of the inertial sensor 1 can be increased. It is noted that the shape of the movable element 32, in particular, the shapes of the connection portions that connect the fixed section 31 to the first and second beams 33, 34 are asymmetrical with respect to the imaginary center line R because the fixed section 31 is located at the center of the movable element 32 in the axis-Y direction.

As described above, in the inertial sensor 1 according to the present embodiment, let R be an imaginary center line that passes through the center of the movable element 32 in the axis-Y direction and extends in the axis-X direction, the center of the combination of the connection portion that connects the fixed section 31 to the first beam 33 and the connection portion that connects the fixed section 31 to the second beam 34 is located on the imaginary center line R in the plan view along the axis-Z direction. As a result, when the substrate 2 warps due to external force or a temperature change, variation in the capacitance Ca between the first movable section 321 and the first detection electrode 81 on one side of the imaginary center line R and variation in the capacitance Ca on the other side can be substantially equal to each other. Similarly, variation in the capacitance Cb between the second movable section 322 and the second detection electrode 82 on one side of the imaginary center line R and variation in the capacitance Cb on the other side can be substantially equal to each other. As a result, the accuracy of the inertial sensor 1 can be increased.

The bonding portion that bonds the fixed section 31 to the substrate 2 is located between the connection portion that connects the fixed section 31 to the first beam 33 and the connection portion that connects the fixed section 31 to the second beam 34 in the plan view along the axis-Z direction, as described above. The size of the fixed section 31 can therefore be reduced. In this case, reducing the size of the inertial sensor 1 or increasing the sizes of the movable element 32 and the first and second detection electrodes 81, 82 allows an increase in the sensitivity of the inertial sensor 1. That is, the inertial sensor 1 can be designed with increased flexibility.

The second embodiment described above can also provide the same effects as those provided in the first embodiment described above.

Third Embodiment

Figure 5:
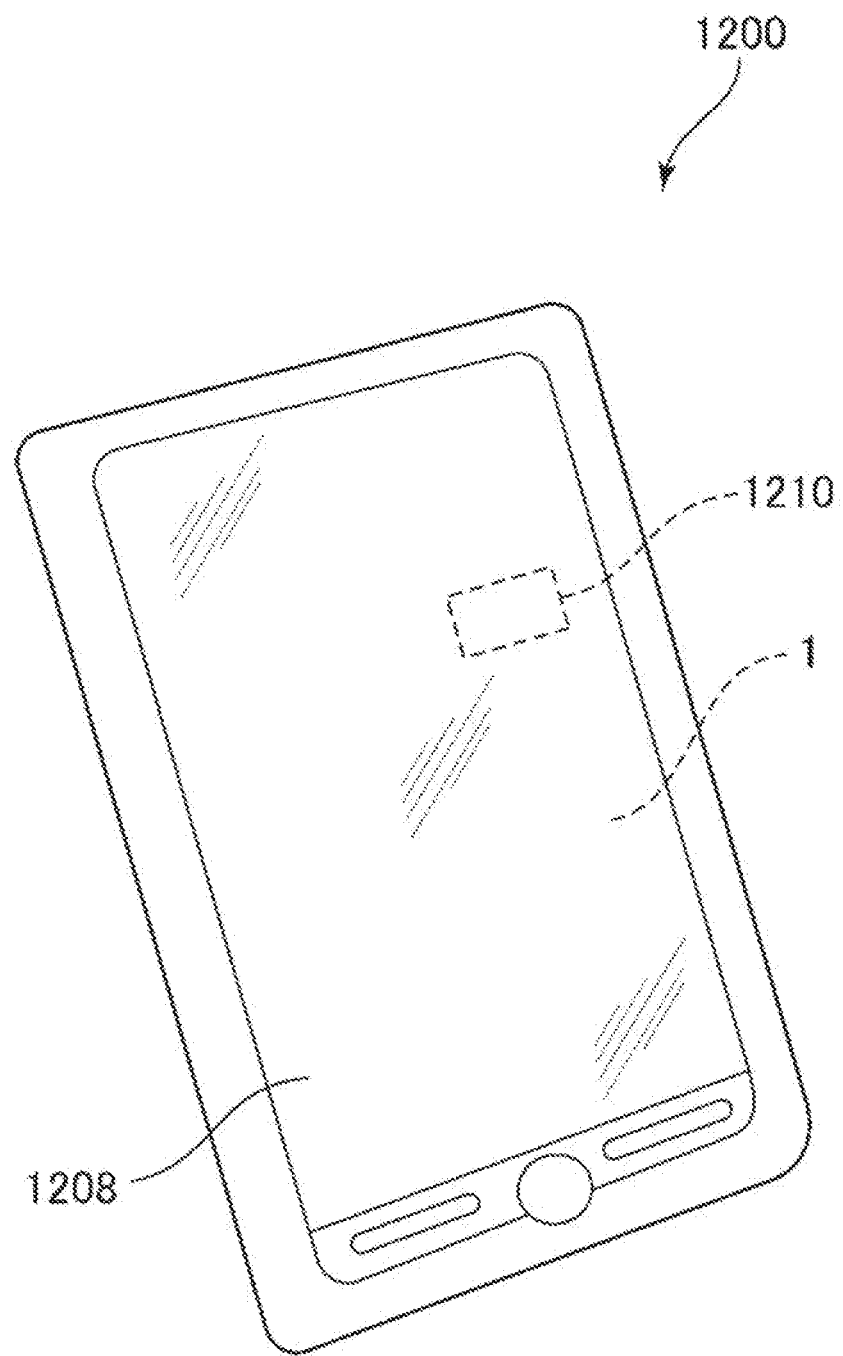
FIG. 5 is a plan view showing a smartphone as an electronic instrument according to a third embodiment.

FIG. 5 is a plan view showing a smartphone as the electronic instrument according to a third embodiment.

A smartphone 1200 shown in FIG. 5 is a smartphone based on the electronic instrument according to the present disclosure. The smartphone 1200 accommodates the inertial sensor 1 and a control circuit 1210, which performs control based on a detection signal outputted from the inertial sensor 1. Detection data detected by the inertial sensor 1 is transmitted to the control circuit 1210, and the control circuit 1210 recognizes the attitude and behavior of the smartphone 1200 based on the received detection data and can change an image displayed on a display section 1208, issue an alarm sound or an effect sound, and drive a vibration motor to vibrate the main body of the smartphone 1200.

The thus configured smartphone 1200 as the electronic instrument includes the inertial sensor 1 and the control circuit 1210, which performs control based on the detection signal outputted from the inertial sensor 1. The smartphone 1200 can therefore benefit from the above-mentioned effects provided by the inertial sensor 1 and hence have high reliability.

The electronic instrument according to the present disclosure is not limited to the smartphone 1200 described above and can, for example, be a personal computer, a digital still camera, a tablet terminal, a timepiece, a smartwatch, an inkjet printer, a laptop personal computer, a television receiver, smart glasses, a wearable terminal, such as a head mounted display (HMD), a video camcorder, a video tape recorder, a car navigator, a drive recorder, a pager, an electronic notepad, an electronic dictionary, an electronic translator, a desktop calculator, an electronic game console, a toy, a word processor, a workstation, a TV phone, a security television monitor, electronic binoculars, a POS terminal, a medical instrument, a fish finder, a variety of measuring instruments, an instrument for a mobile terminal base station, a variety of meters for car, railway car, airplane, helicopter, and ship, a flight simulator, and a network server.

Fourth Embodiment

Figure 6:
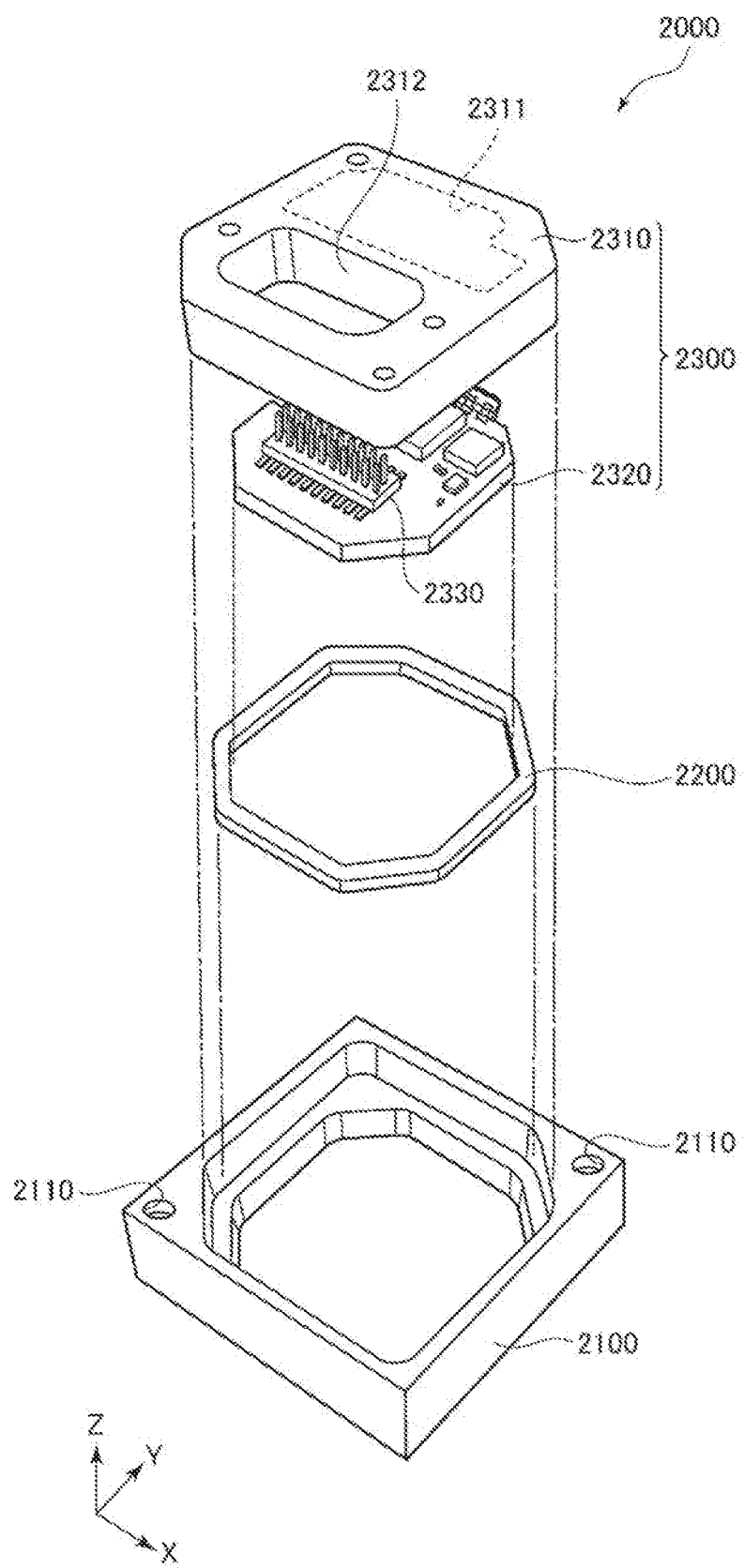
FIG. 6 is an exploded perspective view showing an inertial measurement unit as the electronic instrument according to a fourth embodiment.
Figure 7:
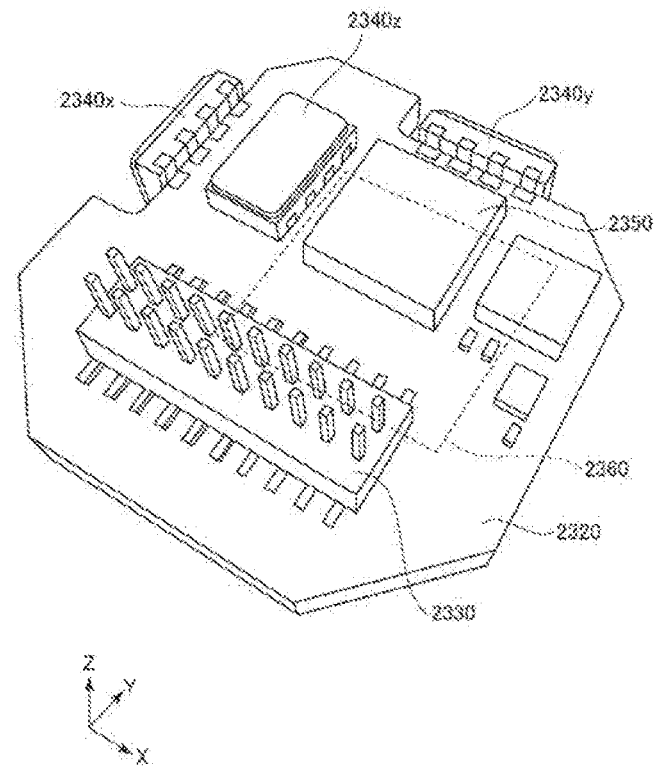
FIG. 7 is a perspective view of a substrate provided in the inertial measurement unit shown in FIG. 6.

FIG. 6 is an exploded perspective view showing an inertial measurement unit as the electronic instrument according to a fourth embodiment. FIG. 7 is a perspective view of a substrate provided in the inertial measurement unit shown in FIG. 6.

An inertial measurement unit 2000 (IMU) shown as the electronic instrument in FIG. 6 is an inertial measurement unit that detects the attitude and behavior of an apparatus to which the inertial measurement unit 2000 is attached, such as an automobile and a robot. The inertial measurement unit 2000 functions as a six-axis motion sensor including a three-axis acceleration sensor and a three-axis angular velocity sensor.

The inertial measurement unit 2000 is a rectangular parallelepiped unit having a substantially square shape in the plan view. Threaded holes 2110 as fixing sections are formed in the vicinity of two vertices of a square body that are vertices located on a diagonal of the square. Two screws screwed into the two threaded holes 2110 can fix the inertial measurement unit 2000 to an attachment surface of the apparatus to which the inertial measurement unit 2000 is attached, such as an automobile. The inertial measurement unit 2000 can be so reduced in size as to be incorporated, for example, in a smartphone and a digital camera by part selection and design change.

The inertial measurement unit 2000 includes an outer enclosure 2100, a bonding member 2200, and a sensor module 2300, and the sensor module 2300 is inserted into the outer enclosure 2100 via the bonding member 2200. The outer shape of the outer enclosure 2100 is a rectangular parallelepiped having a substantially square shape in the plan view, as is the overall shape of the inertial measurement unit 2000 described above. The threaded holes 2110 are formed in the vicinity of two vertices of the square outer enclosure 2100 that are vertices located on a diagonal of the square. The outer enclosure 2100 has a box-like shape, and the sensor module 2300 is accommodated in the outer enclosure 2100.

The sensor module 2300 includes an inner enclosure 2310 and a substrate 2320. The inner enclosure 2310 is a member that supports the substrate 2320 and is so shaped as to be accommodated in the outer enclosure 2100. The inner enclosure 2310 has a recess 2311, which prevents the inner enclosure 2310 from coming into contact with the substrate 2320, and an opening 2312, which exposes a connector 2330, which will be described later. The thus configured inner enclosure 2310 is bonded to the outer enclosure 2100 via the bonding member 2200. The substrate 2320 is bonded to the lower surface of the inner enclosure 2310 with an adhesive.

The connector 2330, an angular velocity sensor 2340z, which detects angular velocity around the axis Z, an acceleration sensor 2350, which detects acceleration in the axes X, Y, and Z, and other components are mounted on the upper surface of the substrate 2320, as shown in FIG. 7. An angular velocity sensor 2340x, which detects angular velocity around the axis X, and an angular velocity sensor 2340y, which detects angular velocity around the axis Y, are mounted on the side surface of the substrate 2320. Any of the inertial sensors according to the present disclosure can be used as the acceleration sensor 2350.

A control IC 2360 is mounted on the lower surface of the substrate 2320. The control IC 2360 is a micro controller unit (MCU) and controls each portion of the inertial measurement unit 2000. A storage stores a program that specifies the order and content for detecting the acceleration and angular velocity, a program that digitizes detected data and incorporates the digitized data in packet data, data associated with the programs, and other pieces of information. A plurality of other electronic parts are also mounted on the substrate 2320.

Fifth Embodiment

Figure 8:
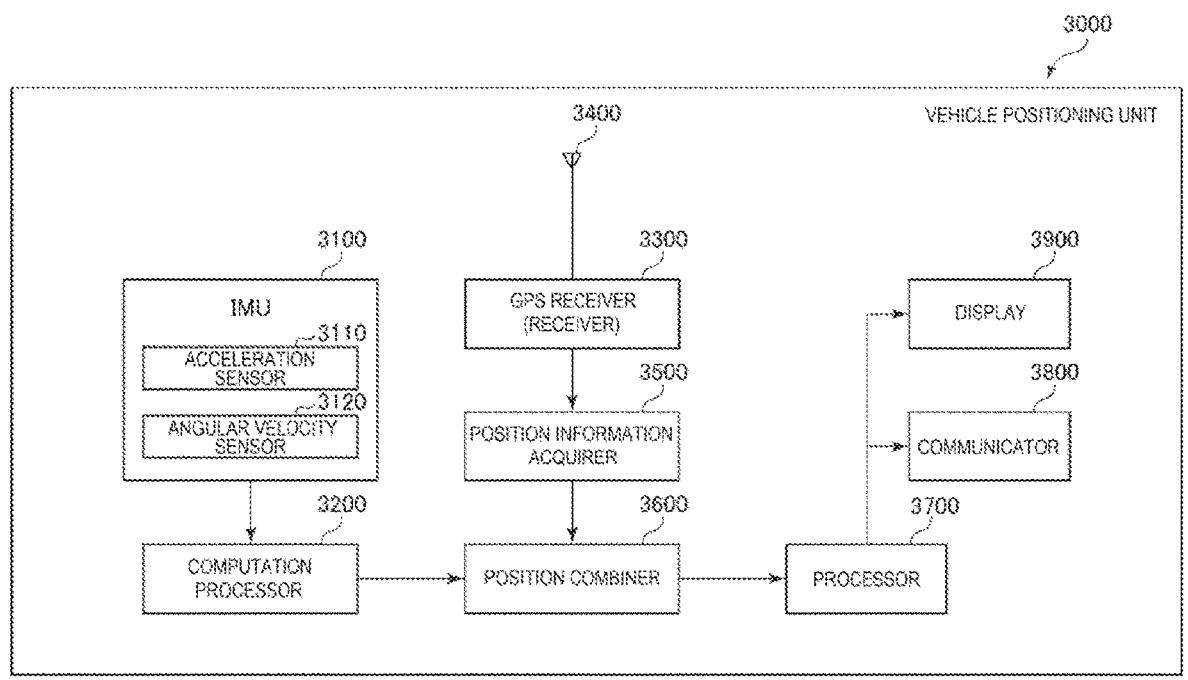
FIG. 8 is a block diagram showing the overall system of a vehicle positioning unit as the electronic instrument according to a fifth embodiment.
Figure 9:
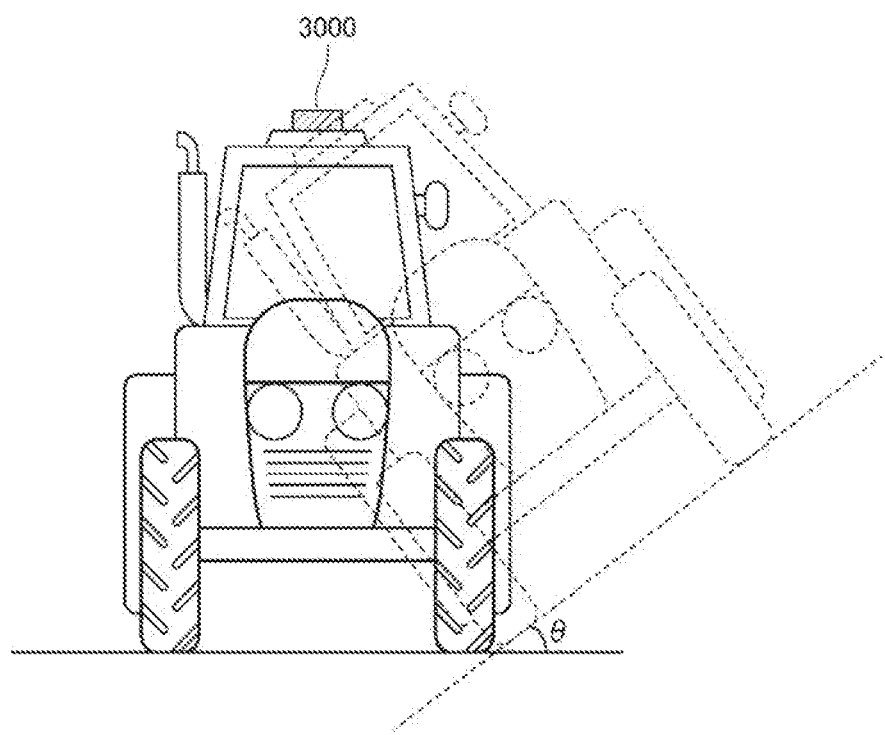
FIG. 9 shows an effect of the vehicle positioning unit shown in FIG. 8.

FIG. 8 is a block diagram showing the overall system of a vehicle positioning unit as the electronic instrument according to a fifth embodiment. FIG. 9 shows an effect of the vehicle positioning unit shown in FIG. 8.

A vehicle positioning unit 3000 shown in FIG. 8 is a unit that is attached to a vehicle when used and measures the position of the vehicle. The vehicle is not limited to a specific vehicle and may be any of a bicycle, an automobile, an autocycle, a train, an airplane, a ship, and other vehicles, and the present embodiment will be described with reference to a case where a four-wheeled automobile, particularly, an agricultural tractor is used as the vehicle.

The vehicle positioning unit 3000 includes an inertial measurement unit 3100 (IMU), a computation processor 3200, a GPS receiver 3300, a reception antenna 3400, a position information acquirer 3500, a position combiner 3600, a processor 3700, a communicator 3800, and a display 3900. The inertial measurement unit 3100 can, for example, be the inertial measurement unit 2000 described above.

The inertial measurement unit 3100 includes a three-axis acceleration sensor 3110 and a three-axis angular velocity sensor 3120. The computation processor 3200 receives acceleration data from the acceleration sensor 3110 and angular velocity data from the angular velocity sensor 3120, performs inertial navigation computation on the data, and outputs inertial navigation positioning data containing the acceleration and attitude of the vehicle.

The GPS receiver 3300 receives signals from GPS satellites via the reception antenna 3400. The position information acquirer 3500 outputs GPS positioning data representing the position (latitude, longitude, and altitude), velocity, and orientation of the vehicle positioning unit 3000 based on the signals received by the GPS receiver 3300. The GPS positioning data also contains status data representing the reception state, the reception time, and other pieces of information.

The position combiner 3600 calculates the position of the vehicle, specifically, the position on the ground along which the vehicle is traveling based on the inertial navigation positioning data outputted from the computation processor 3200 and the GPS positioning data outputted from the position information acquirer 3500. For example, even when the positions of the vehicle contained in the GPS positioning data are equal to one another, but the vehicle has a different attitude due to inclination ⊖ of the ground and other factors, as shown in FIG. 9, the position on the ground along which the vehicle is traveling varies. An accurate position of the vehicle cannot therefore be calculated based only on the GPS positioning data. In this case, the position combiner 3600 uses the inertial navigation positioning data to calculate the position on the ground along which the vehicle is traveling.

The processor 3700 performs predetermined processing on position data outputted from the position combiner 3600, and the processed data is displayed as the result of the positioning on the display 3900. The position data may be transmitted via the communicator 3800 to an external apparatus.

Sixth Embodiment

Figure 10:
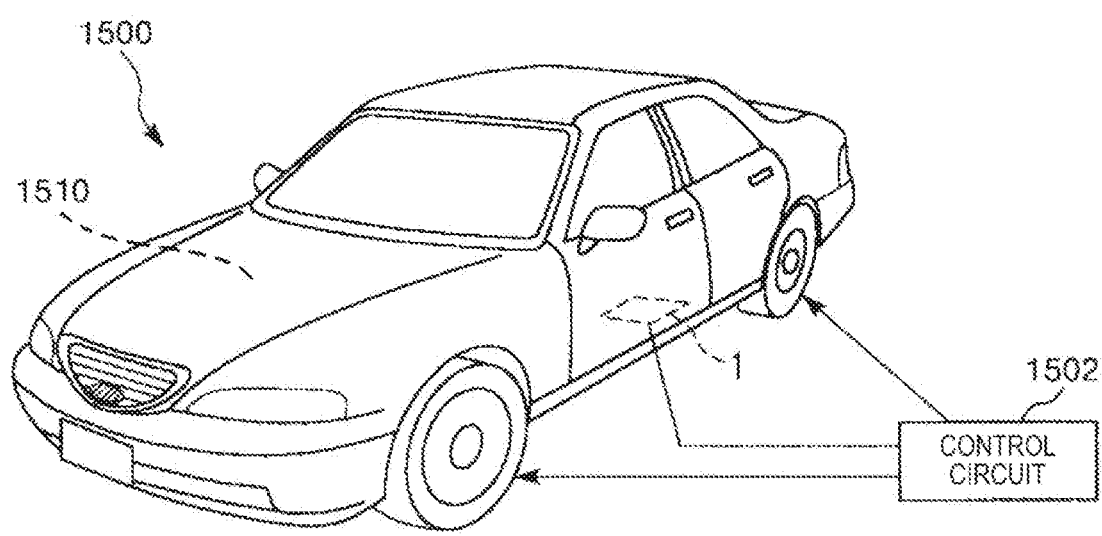
FIG. 10 is a perspective view showing a vehicle according to a sixth embodiment.

FIG. 10 is a perspective view showing a vehicle according to a sixth embodiment.

An automobile 1500 shown in FIG. 10 is an automobile based on the vehicle according to the present disclosure. In FIG. 10, the automobile 1500 includes a system 1510, which is at least any of an engine system, a brake system, and a keyless entry system. The inertial sensor 1 is built in the automobile 1500 and can detect the attitude of the vehicle body. The detection signal from the inertial sensor 1 is supplied to a control circuit 1502, which can control the system 1510 based on the signal.

As described above, the automobile 1500 as the vehicle includes the inertial sensor 1 and the control circuit 1502, which performs control based on the detection signal outputted from the inertial sensor 1. The automobile 1500 can therefore benefit from the above-mentioned effects provided by the inertial sensor 1 and hence have high reliability.

The inertial sensor 1 can also be widely used with a car navigation system, a car air conditioner, an anti-lock braking system (ABS), an airbag, a tire pressure monitoring system (TPMS), an engine control system, and an electronic control unit (ECU) that monitors or otherwise observes a battery in a hybrid automobile and an electric automobile. The vehicle is not limited to the automobile 1500 and may instead, for example, be a railway car, an airplane, a helicopter, a rocket, an artificial satellite, a ship, an automated guided vehicle (AGV), an elevator, an escalator, a bipedal walking robot, a drone or any other unmanned airplane, and a radio control model, a railway mode, and other toys.

The inertial sensor, the electronic instrument, and the vehicle according to the present disclosure have been described above based on the embodiments in the drawings, but the present disclosure is not limited thereto, and the configuration of each portion can be replaced with an arbitrary configuration having the same function. Further, another arbitrarily constituent part may be added to the present disclosure. The embodiments described above may be combined with each other as appropriate.

What is claimed is:

1. An inertial sensor comprising:
three axes perpendicular to one another being defined as an X axis, a Y axis, and a Z axis;
a substrate;
a fixed section fixed to the substrate;
a movable element that swings around a swing axis extending along the Y axis, the movable element being plate-shaped and having a width along the Y axis and a length along the X axis;
a first beam and a second beam that link the fixed section to the movable element and are torsionally deformed by a swing motion of the movable element, the first and second beams being located at an inside of a periphery of the movable element in a plan view along the Z axis; and
a detection electrode that is disposed on the substrate and overlaps with the movable element in the plan view along the Z axis,
wherein the first beam and the second beams have the same torsional spring constant,
the first beam has a first length along the Y axis and a first width along the X axis,
the second beam has a second length along the Y axis and a second width along the X axis,
the first length is larger than the second length, and the first width is larger than the second width,
one end of the first beam is continuously connected to a first part of the movable element at the periphery of the movable element, and an opposite end of the first beam is continuously connected to one end of a base of the fixed section,
one end of the second beam is continuously connected to a second part of the movable element at the periphery of the movable element, and an opposite end of the second beam is continuously connected to an opposite end of the base of the fixed section, and
the first part of the movable element, the first beam, the base, the second beam, and the second part of the movable element are located on a linear line along the Y axis.

2. The inertial sensor according to claim 1,
wherein the first beam has a first thickness along the Z axis, and the second beam has a second thickness along the Z axis, and
the first thickness is the same as the second thickness.

3. The inertial sensor according to claim 1,
wherein the first beam has a first thickness along the Z axis, and the second beam has a second thickness along the Z axis, b corresponds to each of the first and second lengths, w corresponds to each of the first and second widths, and h corresponds to each of the first and second thicknesses, and
the first beam and the second beam have the same value expressed by Expression below:

$$2\frac{Ghw^3}{3b}\left[1 - \frac{192}{\pi^5} \times \frac{w}{h}\tanh\left(\frac{\pi h}{2w}\right)\right].$$

4. The inertial sensor according to claim 1,
wherein the movable element has an opening,
the fixed section, the first beam, and the second beam are disposed in the opening, and
the first beam is located on one side of the fixed section along the Y axis, and the second beam is located on an opposite side of the fixed section along the Y axis.

5. The inertial sensor according to claim 4,
wherein an imaginary center line is so set as to be a straight line that passes through a center along the Y axis of the movable element and extends along the X axis, and
the movable element has a symmetrical shape with respect to the imaginary center line in the plan view along the Z axis.

6. The inertial sensor according to claim 5,
wherein a bonding portion that bonds the fixed section to the substrate is shifted from a region between a connection portion that connects the fixed section to the first beam and a connection portion that connects the fixed section to the second beam in the plan view along the Z axis.

7. The inertial sensor according to claim 4,
wherein an imaginary center line is so set as to be a straight line that passes through a center along the Y axis of the movable element and extends along the X axis, and
a center of a region between a connection portion that connects the fixed section to the first beam and a connection portion that connects the fixed section to the second beam is located on the imaginary center line in the plan view along the Z axis.

8. The inertial sensor according to claim 7,
wherein a bonding portion that bonds the fixed section to the substrate is located between the connection portion that connects the fixed section to the first beam and the connection portion that connects the fixed section to the second beam in the plan view along the Z axis.

9. An electronic instrument comprising:
the inertial sensor according to claim 1; and
a control circuit that performs control based on a detection signal outputted from the inertial sensor.

10. A vehicle comprising:
the inertial sensor according to claim 1; and
a control circuit that performs control based on a detection signal outputted from the inertial sensor.

* * * * *